United States Patent [19]

Spain et al.

[11] Patent Number: 5,506,031
[45] Date of Patent: *Apr. 9, 1996

[54] PLASTIC SIDING PANELS WITH OUTDOOR WEATHERABLE EMBOSSED SURFACES

[75] Inventors: Patrick L. Spain, Lowell; Keith L. Truog, Crown Point, both of Ind.

[73] Assignee: Avery Dennison Corporation, Pasadena, Calif.

[*] Notice: The term of this patent shall not extend beyond the expiration date of Pat. No. 5,284,693.

[21] Appl. No.: 192,422

[22] Filed: Feb. 7, 1994

Related U.S. Application Data

[60] Division of Ser. No. 954,554, Sep. 30, 1992, Pat. No. 5,284,693, which is a continuation-in-part of Ser. No. 424,130, Oct. 19, 1989, abandoned.

[51] Int. Cl.$^6$ .................................................. B32B 3/00
[52] U.S. Cl. ........................ 428/172; 428/142; 428/143; 428/156; 428/167; 428/207; 428/212; 428/542.2
[58] Field of Search .................................. 428/156, 172, 428/142, 143, 167, 209, 542.2, 141, 187, 206, 207, 212, 409, 323

[56] References Cited

U.S. PATENT DOCUMENTS

| | | | |
|---|---|---|---|
| 3,010,861 | 11/1961 | Reese | 156/199 |
| 3,421,973 | 1/1969 | Kamai | 161/189 |
| 3,679,506 | 7/1972 | Burgess et al. | 156/209 |
| 3,980,512 | 9/1976 | Rauser | 156/231 |
| 4,007,067 | 2/1977 | Dunning | 156/61 |
| 4,049,374 | 9/1977 | Rejo | 8/2.5 |
| 4,231,831 | 11/1980 | Gebhard | 156/233 |
| 4,263,077 | 4/1981 | Rampelberg | 156/238 |
| 4,352,771 | 10/1982 | Szabo | 264/210.2 |
| 4,415,519 | 11/1983 | Strassel | 264/171 |
| 4,473,422 | 9/1984 | Parker et al. | 156/233 |
| 4,515,849 | 5/1985 | Keino et al. | 428/101 |
| 4,755,414 | 7/1988 | Lacatus et al. | 428/156 |
| 4,786,350 | 11/1988 | Nesbitt et al. | 156/244.24 |
| 4,787,837 | 11/1988 | Bell | 425/385 |
| 4,816,317 | 3/1989 | Balmer | 428/172 |
| 5,284,693 | 2/1994 | Spain et al. | 428/156 |

FOREIGN PATENT DOCUMENTS 266107  5/1988  European Pat. Off. .

*Primary Examiner*—Donald J. Loney
*Attorney, Agent, or Firm*—Christie, Parker & Hale

[57] ABSTRACT

A process for making plastic siding panels, such as outdoor weatherable vinyl panels with an embossed wood grain pattern, comprises extruding a vinyl sheet, and overlaying on the extruded sheet a flexible carrier sheet having coated thereon (a) matte release layer bonded to the carrier sheet, and (b) decorative coating on the matte release layer facing toward the extruded plastic sheet. An embossing roll applies pressure at elevated temperatures to transfer the decorative coating from the matte release layer and bond it to the extruded sheet, while the embossing roll embosses a three-dimensional impression pattern in the laminate transferred to the extruded sheet. The carrier sheet and its matte release layer are then released from the laminate transferred to the vinyl sheet. The matte release layer transfers a low 75° gloss level, preferably in the range of 8 to 12 gloss units, while enabling free release of the carrier from the embossed low gloss surface at elevated temperatures. In one embodiment, a multi-layer wood grain printed acrylic/polyvinylidene fluoride blended decorative coating is simultaneously transferred to a vinyl extrusion and embossed with a three dimensional wood grain texture. A color coat behind wood grain print coats contains pigment at a level that protects the vinyl substrate from UV deterioration. The matte release layer contains a suspended wax which enhances forming the low gloss surface while improving release of the matte release layer from the transferred laminate. A silicone resin in the matte release coat combines with the wax to further enhance release properties.

17 Claims, 5 Drawing Sheets

1

PLASTIC SIDING PANELS WITH OUTDOOR WEATHERABLE EMBOSSED SURFACES

CROSS-REFERENCE

This is a division of application Ser. No. 07/954,554, filed Sep. 30, 1992, now U.S. Pat. No. 5,284,693, which is a continuation-in-part of application Ser. No. 07/424,130, filed Oct. 19, 1989, now abandoned.

FIELD OF THE INVENTION

This invention relates to a process for producing an outdoor weatherable plastic siding panel useful for the surfacing of frame buildings. More particularly, one embodiment of the invention relates to a process for transferring a decorative weatherable coating to a thermoplastic extrudate and embossing a three-dimensional impression pattern in the resulting laminate, to produce a plastic siding panel with a surface resembling natural wood grain.

BACKGROUND OF THE INVENTION

The present invention will be described with relation to its use in the building and construction industry for producing outdoor weatherable plastic siding panels made from vinyl (polyvinylchloride or PVC). The following description relating to vinyl siding panels is an example of one use of the invention for producing outdoor weatherable embossed decorative surfaces on extruded plastic sheets.

Wood, metal and vinyl are materials commonly used as boards or shingles for siding in the construction and remodeling of commercial and residential structures. Painted wood is perhaps the most aesthetically pleasing of these materials to the consumer, but wood suffers from deterioration by rotting and attack by insects, rodents and birds. Wood surfaces need constant reprotection with paint, stains and water sealants.

Advantages of metal over wood include the ability to provide a baked-on finish which is more resistant to the elements than coatings applied to wood, thus eliminating subsequent material and labor costs to the consumer. However, metal-based siding has less thermal insulation value and is sensitive to scratching and denting by hail and other blows to the surface. In addition, it does not have the pleasing look of a wood surface.

Vinyl siding has an economic advantage over most high quality wood and metal siding. It has better insulating qualities than metal, and it is more resistant to denting and scratching. However, vinyl is sensitive to degradation from ultraviolet rays of the sun. Previously, vinyl siding has suffered aesthetically compared to wood because of the generally higher gloss or uniform sheen of vinyl siding, which has a rather unnatural or plastic look. In addition, it is difficult to decorate vinyl surfaces with a natural-looking wood grain pattern that is pleasing to the consumer.

The present invention overcomes the drawbacks of presently available vinyl siding by providing a process that economically produces a vinyl-based siding panel with a superior outdoor weatherable surface having the look of either a painted wood surface or natural unpainted wood grain.

A vinyl siding presently on the market is made by a process in which an extruded sheet of PVC is decorated and embossed to produce a wood grain appearance. A silicone-coated release paper is used in this process to transfer a printed wood grain pattern to the vinyl. Typically, an acrylic clear coat and a color coat with a wood grain pattern are coated on the paper carrier sheet and then transfer-laminated onto the vinyl extrusion under heat and pressure. The wood grain color coat can simulate the appearance of painted or unpainted wood. The clear coat and wood grain color coat bond to the extrusion and release from the paper carrier sheet so that the clear coat forms a protective outer coating for the underlying wood grain color coat. During the transfer process, the release paper is pressed into contact with the extrusion by an embossing roll which transfers deep embossments to the surface of the transferred decorative wood grain. The deep embossments or indentations produce a "shadow" effect in the finished surface that more truly resembles the sheen of natural wood. Without these embossments, the vinyl wood grain-simulating surface has a flat appearance at different light angles - an unnatural look that gives the unsatisfactory appearance of a plastic simulated wood panel.

There are several drawbacks to this prior art process of making vinyl wood grain panels. A principal disadvantage is that gloss levels produced by this process are too high. Surface gloss can be measured by various techniques; and according to one technique (ASTM designation D 3679-86, 5.11), surface gloss levels produced by the prior art process generally have a 75° gloss reading from about 40 to about 50 gloss units. A much lower matte surface with a gloss reading below about 20 gloss units, and preferably below about 12 gloss units, is desirable to produce a more natural looking simulated wood grain finish.

In addition to its surface gloss problem, the silicone-coated paper carrier sheet of the prior art can prevent carefully controlled printing of the decorative coatings. The carrier sheet also should release freely from the decorative layer transferred to the extruded vinyl sheet. Transfer of the decorative wood grain layer to the vinyl sheet takes place at high temperatures, since the decorative coating may be transferred to the heated vinyl extrusion immediately after it exits the extruder die opening. The vinyl sheet is also embossed when the wood grain coat is transferred, and embossing temperatures should be high in order to physically form the embossments. A substantial reduction in temperature of the vinyl extrusion prior to embossing can inhibit forming the deep embossments. If the transferred wood grain coat has a highly roughened surface, in order to produce lower gloss, the surface roughness can interfere with proper release of the carrier sheet. At the high transfer and embossing temperatures, certain coatings on the carrier sheet can preferentially adhere to the carrier rather than properly releasing from it.

The decorative coatings transferred to a vinyl sheet to provide a wood grain or other surface finish also should protect the underlying vinyl panel from UV degradation, delamination, and other weather problems.

Thus, there is a need for a process for manufacturing decorative wood grain vinyl sheets with a sufficiently low gloss surface to resemble the appearance of natural wood grain, painted or unpainted. In a transfer process in which the wood grain coating is printed on a carrier and transferred from the carrier to a vinyl extrusion, while the vinyl is being deeply embossed, there is a need to ensure that the decorative wood grain coat properly releases from the carrier and bonds to the vinyl. The deep embossing step must not be adversely affected; the low matte surface of the decorative wood grain must not adversely affect proper release from the carrier; and these steps must be carried out at the high temperatures and pressures necessary for proper embossing.

One aspect of this invention provides a process for making decorative wood grain extruded vinyl sheeting suitable for outdoor use, in which the surface of the decorative wood grain has a sufficiently low gloss to resemble natural wood grain. The decorative wood grain surface can be deeply embossed to produce a natural looking surface. The low gloss wood grain coat transfers to an extruded vinyl sheet and properly bonds to the vinyl extrusion, while the carrier on which it is coated properly releases from the transferred decorative surface at elevated temperatures. The invention also provides extruded plastic siding panels with weatherable decorative surface coatings that inhibit long term UV deterioration and delamination problems.

SUMMARY OF THE INVENTION

Briefly, one embodiment of this invention provides a process which includes extruding a plastic sheet and overlaying on the extruded sheet a flexible carrier film having (a) a matte release layer bonded to the carrier and (b) a decorative coating on the matte release layer facing toward the extruded plastic sheet. The matte release layer is a chemical matte coating having a low gloss matting agent dispersed in it. Pressure is applied to the carrier and the heated extruded sheet with an embossing roll on the side of the carrier opposite from the extrusion. This transfers the decorative coating from the matte release layer and bonds it to the surface of the extruded sheet, while deep three dimensional impressions are embossed in the outer surface of the decorative coating transferred to the extrusion. The matte release layer transfers a low surface gloss to the outer surface of the decorative coating sufficient to resemble natural wood grain. The matte release layer contains a release agent which freely releases the release coated carrier from the embossed low gloss surface of the decorative coating.

In one embodiment of the process, a wood grain printed coating is simultaneously transferred to the extrusion and embossed in a three dimensional wood grain texture. The extrusion is maintained at a controlled high temperature to facilitate embossing the three-dimensional impressions which are then permanently set by a controlled temperature reduction which also improves release of the carrier sheet and its matte release coat from the embossed wood grain laminate.

A preferred outdoor weatherable coating transferred to the extrusion comprises an acrylic/fluoropolymer blended clear coat and an underlying printed wood grain decorative layer. Good results are obtained when a cast fluoropolymer resin is used in an underlying color coat of the printed wood grain pattern. A pigmented color coat is especially useful in preventing UV degradation and delamination of the clear coat/color coat paint layers from an extruded vinyl substrate.

These and other aspects of the invention will be more fully understood by referring to the following detailed description and the accompanying drawings.

DETAILED DESCRIPTION

Figure 1:
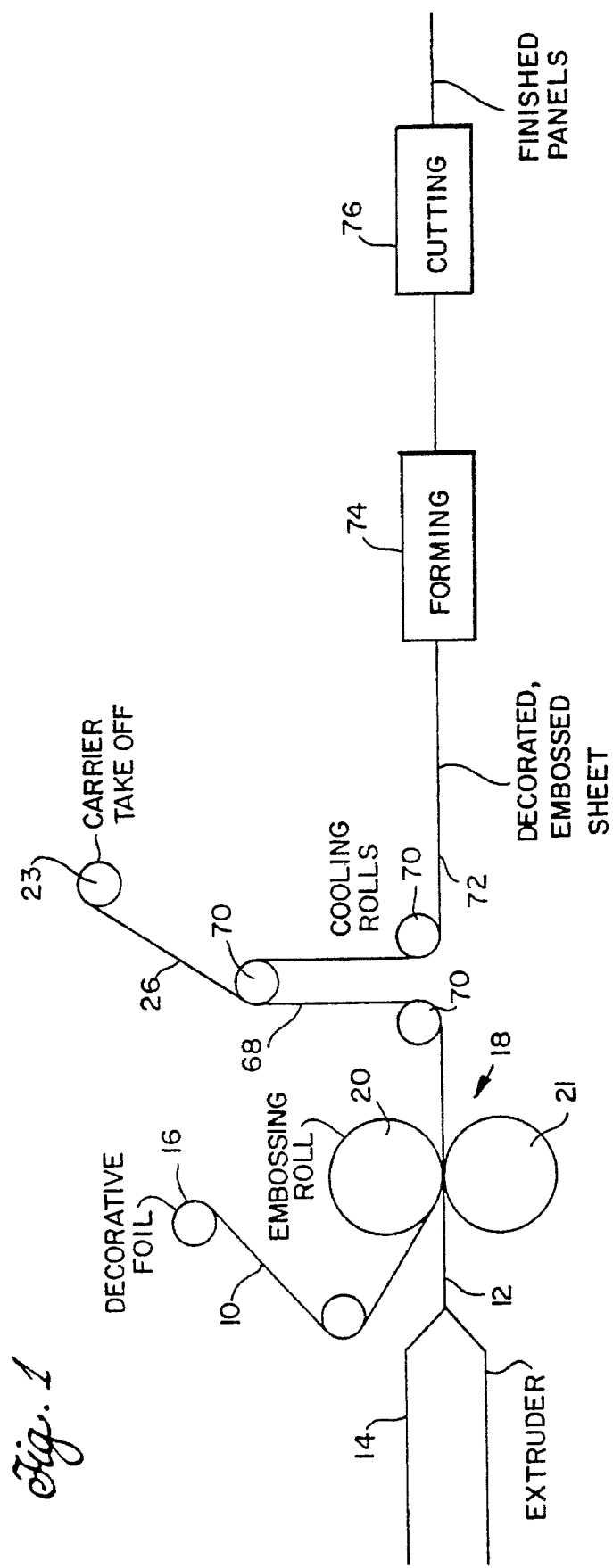
FIG. 1 is a schematic diagram illustrating an in-line decorative transfer and embossing step in a process for making extruded plastic siding panels with embossed decorative wood grain surfaces according to principles of this invention.

FIG. 1 schematically illustrates one embodiment of a process for making extruded plastic siding panels with embossed decorative wood grain surfaces. The process is useful in the manufacture of outdoor weatherable embossed plastic siding panels used for the surfacing of frame buildings or other outdoor structures. The invention will be described in relation to its use in the manufacture of extruded vinyl (PVC) siding panels, although the invention is equally applicable to the manufacture of panels made from other extrudable plastic substrate materials such as polystyrene, acrylonitrile-butadiene-styrene (ABS), nylon, ethylene-vinyl acetate (EVA), polycarbonate, polyethylene, polypropylene, polyethylene terepthalate, thermoplastic olefins, acrylonitrile-styrene-acrylic (ASA), and alloys, blends or coextrusions of these resins.

The process solves the problem of forming outdoor weatherable surfaces closely resembling natural wood grain on extruded plastic sheets. Exterior surfaces produced by the invention have the look of either painted or unpainted wood.

Referring briefly to FIG. 1, a painted wood-like plastic siding panel is produced by a dry paint transfer and embossing process in which a transfer laminate in the form of a decorative wood grain foil 10 is transferred to a surface of a thin, flexible extruded plastic sheet or film 12 which is continuously extruded from the exit die opening of an extruder 14 using conventional plastic extrusion techniques.

The decorative foil is made by a multistage coating process described below and illustrated in FIGS. 2 and 3. The wood grain printed foil includes multiple synthetic resinous paint coats printed or cast on a temporary flexible carrier sheet. The resinous paint coats are molecularly unoriented in the sense that they are cast or roller coated on the carrier or casting sheet. The wood grain-printed transfer foil produced by the coating process is installed as a supply roll 16 in the transfer and embossing process depicted in FIG. 1. The plastic sheet 12 continuously extruded from the extruder 14 and the foil 10 unwound from the roll 16 are passed through the nip of a decorative transfer and embossing station 18 which includes a metal embossing roller 20 and a rubber backup roller 21. A multilayer wood grain-printed synthetic resinous coating is simultaneously transferred from the foil carrier to the surface of the extrudate while a three-dimensional wood grain texture is embossed in the surface of the laminate. The transferred coating is an outdoor weatherable multilayer synthetic resinous coating that simulates the appearance of natural wood grain, painted or unpainted. Following the embossing step, the temporary carrier sheet portion 26 of the foil is then stripped away and wound on a carrier take off roll 23. Further steps in the process are described below.

In one embodiment in which the process is used for the production of vinyl siding, the extruded sheet 12 preferably comprises an impact-modified PVC suspension resin. In one embodiment, the extruded vinyl sheet material contains a pigment that forms the background color for the finished siding panel. The extruded sheet is preferably extruded to a uniform film thickness from about 30 to about 80 mils and is extruded from the die exit opening at a temperature from about 385° to about 400° F. The transfer and embossing station 18 is located sufficiently close to the extruder die opening so that the extrusion is embossed, using the heat of extrusion at elevated temperatures sufficient to form deep three-dimensional embossments in the laminated extrusion. In one embodiment, the embossing roller is located a distance of about five inches downstream from the extruder die exit opening. This maintains the temperature of the extruded film during transfer and embossing near its natural extruder die exit temperature. By embossing at such elevated temperatures, the natural temperature drop of the extrusion which occurs after it exits the extruder die opening is sufficiently limited so the embossments can be formed in the pliable sheet without requiring reheating of the extrusion prior to embossing.

The metal embossing roller 20 has a pattern of surface protrusions for simulating the texture and pattern of a natural wood grain surface. The embossing roller applies pressure to the foil to transfer the wood grain simulating coating to the extrusion 12, while embossing three-dimensional indentations in the exterior of the decorative coating transferred to the extrusion. By maintaining the embossing temperature of the extrudate substantially near its temperature at the extruder die opening, the extrusion is sufficiently pliable that embossed indentations are permanently formed in the transferred decorative layer.

The transfer process also produces a low gloss surface on the transferred decorative wood grain coating which, combined with the embossments formed in the coating, closely resembles the appearance of a natural wood grain surface. The low gloss surface is transferred by replicating the surface of a matte release coat adhered to the temporary carrier film. Details of the techniques for forming the low gloss surface on the transferred wood grain coat are more fully understood by the description to follow.

Figure 2:
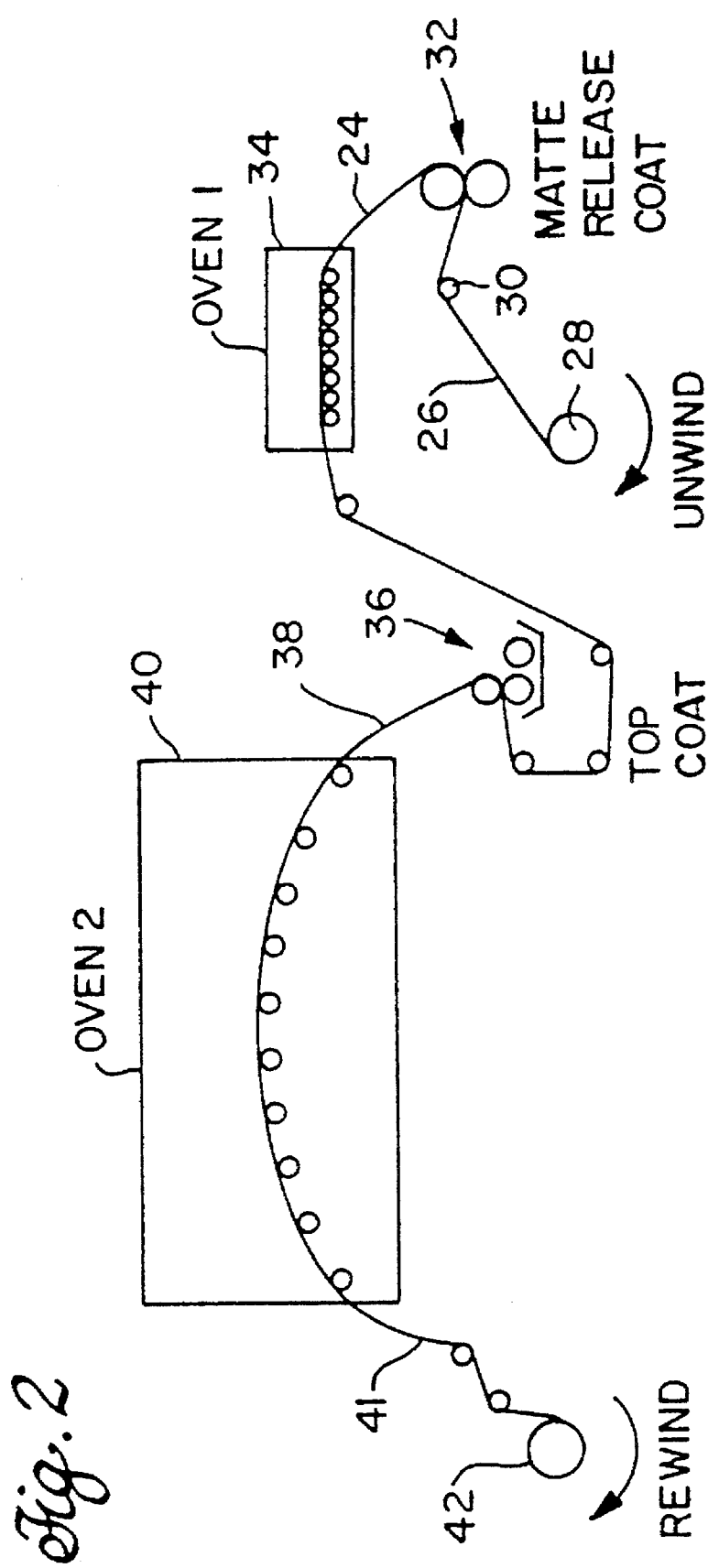
FIG. 2 is a schematic diagram illustrating a first step in the process.

FIG. 2 schematically illustrates a first step in a coating process for forming the decorative wood grain foil. FIG. 3 schematically illustrates a second step in the coating process for making the foil. FIG. 4 is a schematic cross-sectional view illustrating components of the decorative foil during its use in the transfer and embossing step of the process.

Referring to FIG. 2, a first step in the process includes coating a matte release coat 24 in thin film form onto a surface of the flexible, foldable, heat-resistant, substantially inelastic, self-supporting temporary carrier film 26. The carrier is preferably an oriented polyester casting film such as Mylar (a trademark of DuPont), Hoechst Celanese Hostaphan 2000 polyester film, or the like. The film thickness of the carrier sheet is less than one mil, and is preferably about 0.48 to about 0.75 mil thick. Since the wood grain-printed coat on the carrier is embossed through the depth of the carrier film, the carrier film does not have a thickness which inhibits forming the embossed three-dimensional impressions in the wood grain printed coat. The carrier film also has a film thickness which provides sufficient strength to permit its release from the wood grain-printed coat at the elevated temperatures described below.

The carrier film 26 is contained on a supply roll 28 from which the carrier is unwound, passed around an idler roller 30, and then passed to a gravure print station 32 where the matte release coat 24 is gravure-coated onto the carrier film by a conventional gravure cylinder. The carrier film containing the matte release coat 24 is then passed through a first drying oven 34, preferably a 20-foot long impinging air oven operated at a temperature from about 325° to about 350° F., sufficient for drying and cross-linking the matte release coat. In the first stage drying oven, the matte release coat is sufficiently cross-linked to permanently bond it to the carrier sheet. Preferably, the matte release coat is coated and dried to produce a coat weight (dry) from about 3 to about 5 gr/m$^2$. The carrier containing the matte release coat 24 which has been dried and cross-linked exits the first stage oven 34 and is then passed to a reverse-roll coater station 36 for coating an outdoor weatherable protective clear coat or top coat 38 onto the dried matte release coat. The top coat is preferably transparent, although it can be pigmented, but in this case, it is preferred that any pigmentation be at a sufficiently low level that underlying print coats are visible through the top coat. The cast top coat 38 is then passed to a second drying oven 40, preferably a 120-foot long impinging air oven. This oven can be in multiple stages with drying zones of different controlled temperatures, depending upon the drying characteristics of the top coat. Preferably, a cast top coat comprising an acrylic/polyvinylidene fluoride blend, described below, is dried and fused at an oven air temperature of about 340° F. to form a weatherable clear coat on the matte release film.

The dried, clear-coated film 41 is removed from the second drying oven 40 and wound onto a rewind roll 42 at the output of the first coating stage.

Figure 3:
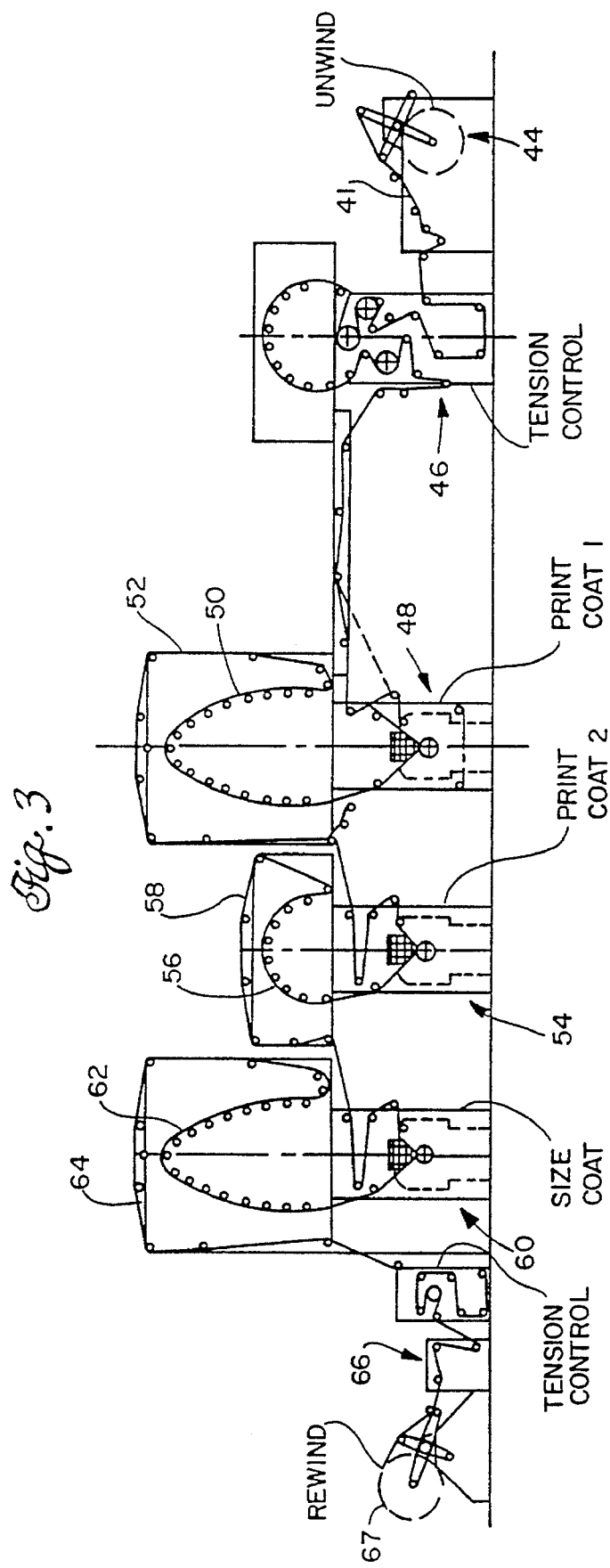
FIG. 3 is a schematic diagram illustrating a second step in the process, prior to the decorative transfer and embossing step.
Figure 4:
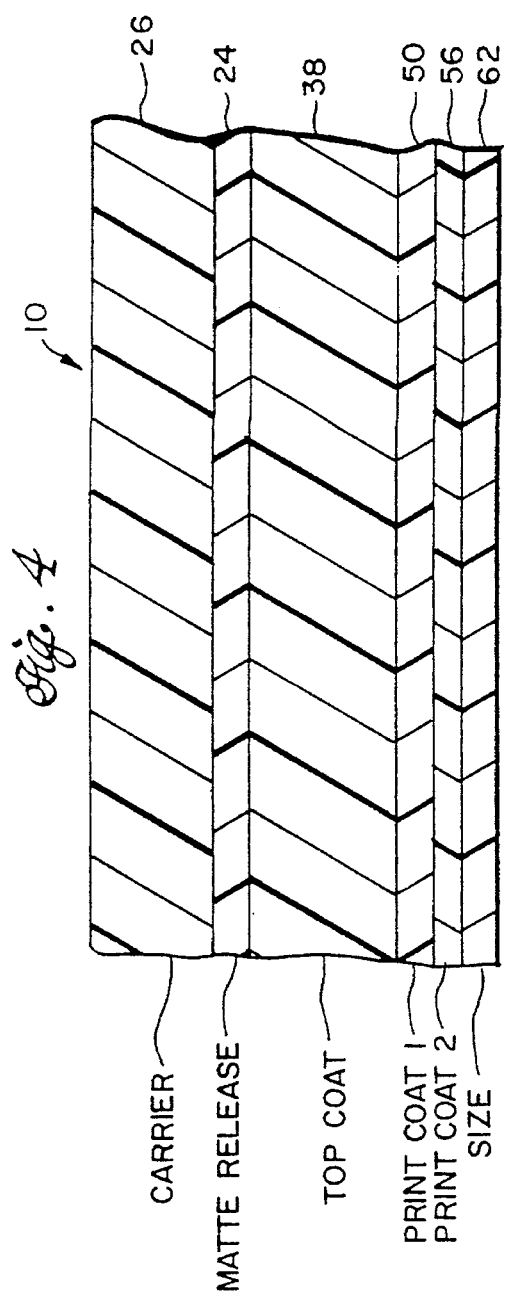
FIG. 4 is a schematic cross-sectional view illustrating components of one embodiment of a decorative wood grain foil according to this invention.

The dried, coated film 41 produced from the first coating stage is then removed and installed at an unwind station 44 of a second coating stage schematically illustrated in FIG. 3. In the second stage coating system, the clear-coated side of the film 41 is gravure printed with a series of synthetic resinous print coats to provide a selected wood grain print pattern on the film. FIG. 3 is an example of one embodiment in which the clear-coated side of the film is printed with a series of two wood grain print coats, followed by a size coat for use in later bonding the decorative foil to the extruded sheet 12 during the transfer and embossing stage of the process.

Referring to FIG. 3, the dried, coated film 41 passes from the unwind roll 44 through a tension-control stage 46, after which the foil passes to a first wood grain print station 48 where a first synthetic resinous wood grain ink is gravure-printed onto the clear coated side of the foil. This forms a first wood grain print coat 50 on the exterior of the foil. The first print coat is typically in a discontinuous wood grain print pattern. The foil is then passed to a first drying oven 52 for drying the first wood grain print coat 50 at an air temperature of about 250° F.

The foil then travels to a second gravure print station 54 for printing a second synthetic resinous wood grain ink pattern on the foil. This forms a second wood grain print coat 56 on the dried first print coat 50. The foil is then passed to a second drying oven 58, also operated at an air temperature of about 250° F. for drying the second print coat.

In the illustrated embodiment, two wood grain print stages are shown, although further wood grain print coats or continuous color coats and corresponding drying steps can be used, depending upon the desired print pattern. The wood grain inks used in the illustrated print coats comprise a pigmented synthetic resinous coating composition which can be coated in thin-film form in a discontinuous print pattern onto the surface of the cast top coat by conventional coating techniques. The wood grain coatings can be produced by any conventional pigmented lacquer, typically blended with a suitable solvent and containing a pigment dispersion to provide the desired coloration. Pigmentation for the underlying color of the wood grain-simulating panel can be contained in the extruded vinyl sheet; however, pigmentation for the wood grain print coats, such as by an underlying color coat described below, makes it possible to avoid use of larger, more costly amounts of pigment in the vinyl extrusion.

The wood grain print coats can be formulated from a thermoplastic synthetic resinous coating composition containing an acrylic resin, such as polymethylmethacrylate or polyethylmethacrylate, or mixtures thereof, including methacrylate copolymer resins and minor amounts of other comonomers; or the print coats can be made from a fluoropolymer resin, such as polyvinylidene fluoride (PVDF) or polyvinyl fluoride (PVF); or the print coats can be formulated of blends of fluoropolymer and acrylic resins. The level of pigmentation in the coating can range up to about 40% by volume, depending upon the depth of color needed for the particular wood grain pattern being printed. However, less than about 10% pigment by volume is preferred. The dry coat weight of the wood grain print coats ranges from about 0.1 to about 2 gr/m$^2$. Example 6 below describes in more detail the pigments that can be used in the wood grain printing inks.

Referring again to FIG. 3, the foil containing the dried wood grain print coats passes from the second drying oven 58 to a gravure print station 60 where a size coat 62 is coated on the dried second wood grain print coat. (If additional color coats are used, then the size coat is coated on the finished, dried color coat.) The size coat is then passed through an impinging air oven 64 operated at a temperature of about 250° F. for drying the size coat. The size coat is applied using a gravure cylinder and can contain pigment up to about 25% by volume, although less than 10% by volume is preferred. The dried coat weight of the size coat ranges from about 1 to about 3 gr/m$^2$.

The size coat 62 comprises any of various suitable coating compositions to provide adhesion of the decorative foil to the extruded sheet 12 during the transfer and embossing step carried out later during the process. The size coat preferably comprises a suitable thermoplastic resinous material such as an acrylic resin. In one embodiment, the size coat comprises a polymethylmethacrylate or polyethylmethacrylate-containing resin. Such a size coat formulation is sufficient for providing a good bond to an extrusion made from a PVC resin.

In certain instances in which a backing sheet may be made from a thermoplastic olefin such as polypropylene or polyethylene, a different size coat can be used. In this instance, the size coat is preferably made from a coating composition of a solution of a thermoplastic chlorinated polyolefin (CPO). A preferred CPO size coat preferably is a chlorinated polypropylene or chlorinated polyethylene, in which the coating composition contains about 10% to about 60% by weight of the CPO, and correspondingly, about 50% to about 90% by weight solvent.

Following drying of the size coat 62, the foil exits the drying oven 64 and is passed through a second tension control system 66 prior to being wound on a supply roll 67. The completed foil is then removed from the second coating system and installed at the unwind station 16 of the extruder-laminator shown in FIG. 1.

Figure 6:
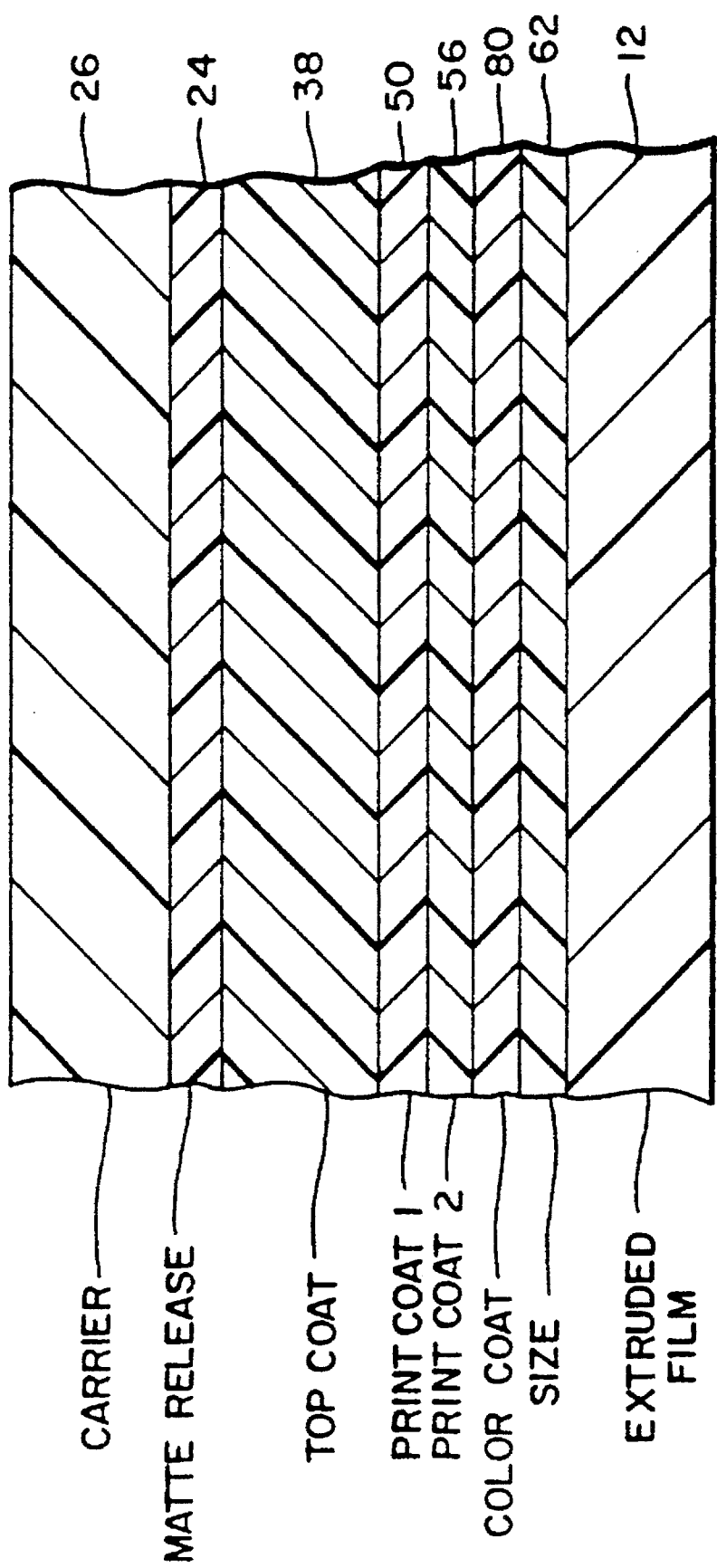
FIG. 6 is a schematic cross-sectional view illustrating components of another embodiment of a decorative wood grain foil that retards UV degradation according to the principles of this invention.

FIG. 6 shows an embodiment in which a continuous color coat 80 is cast on the dried print coat to provide background color for the decorative wood grain coating. The color coat 80 contains a sufficient level of pigment to improve resistance to UV degradation of the vinyl sheet and resulting delamination, as described in more detail below. The color coat 80 preferably comprises a coating containing a fluoropolymer resin. A cast, weatherable color coat containing PVDF is preferred; in one embodiment, the color coat contains a blend of PVDF and an acrylic resin, such as polymethylmethacrylate or polyethylmethacrylate. Coloration can be produced with pigments comprising mixed metal oxides (MMO's), although organic pigments also may be used.

Figure 5:
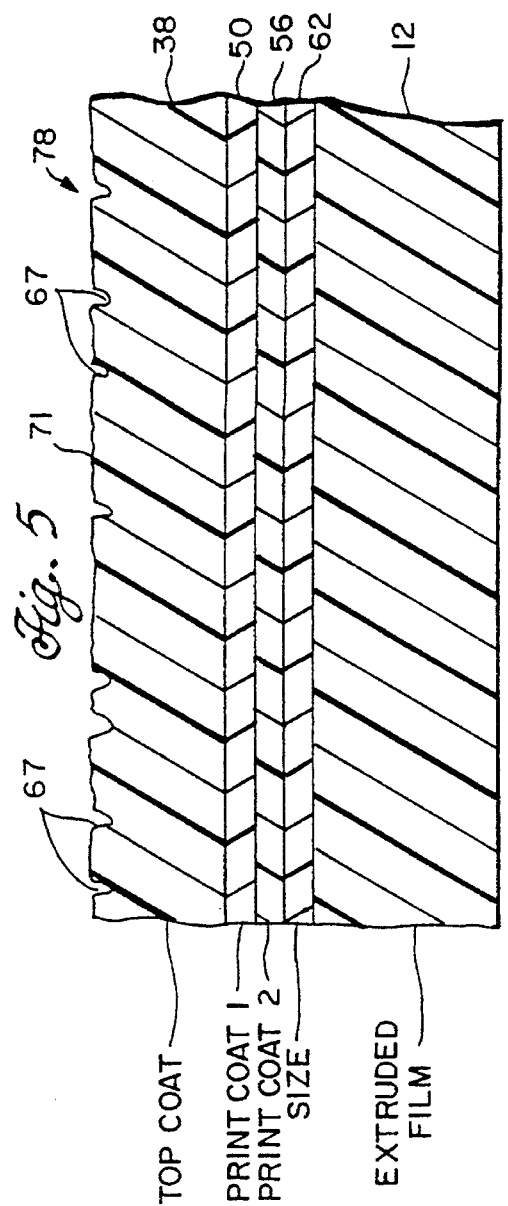
FIG. 5 is a schematic cross-sectional view illustrating components of a finished plastic siding panel.

Referring again to FIG. 1, during the transfer-embossing step, the wood grain printed transfer foil 10 is fed to the nip of the embossing roll 20 so that the carrier film 26 is in pressure contact with the metal embossing roller and the size coat 62 on the foil is in pressure contact with the extruded plastic film 12. The embossing roll 20 imprints a three-dimensional pattern of impressions 67 (see FIG. 5) in the outer surface of the top coat 38. Embossing is done through the depth of the carrier film 26. Since embossing is carried out when the extruded sheet 12 is at a temperature below, but reasonably close to, its extrusion die exit temperature, the extrusion is sufficiently pliable to facilitate embossing deep three-dimensional impressions (up to an average depth of about 120 microns) through the carrier film and into the depth of the top coat 38 on the surface of the extruded sheet. The carrier film is sufficiently thin (about 0.48 to about 0.75 mil) to cause the metal embossing roller pattern to be physically transferred through the carrier film to the top coat, while still maintaining a carrier film strength sufficient to be hot stripped from the embossed top coat at the stripping station 23 downstream from the embossing station 18.

When the decorative foil is pressed into contact with the extruded sheet, the extrusion temperature is also sufficiently elevated to bond the foil to the extruded sheet. The polyester carrier sheet has a heat resistance well above the extrusion die exit temperature, so the carrier resists elongation or deformation during the transfer and embossing step.

Following the embossing and transfer step, the flexible, laminated extruded film 68 (see FIG. 1) undergoes controlled cooling from the nip of the embossing roll to the point where the carrier is stripped from the laminate. A series of water-cooled chill rollers 70 produce a controlled temperature reduction in the laminate 68. The laminate is cooled to a temperature in the range from about 295° to about 340° F. occurring at the point where the carrier film 26 is stripped from the laminate. The preferred stripping temperature is 308° F. Cooling to the lower temperature also sets the impressions embossed in the laminate. If the temperature stays too high, flowability of the laminate can cause the impressions to smooth out. The temperature drop also enhances freely removing the carrier from the laminate.

The matte release coat 24, which has been cross-linked and permanently bonded to the carrier sheet 26, remains adhered to the carrier film during the stripping process. The matte release coat has a chemical matte outer surface with a micro-roughness which transfers a low gloss surface 71 (see FIG. 5) to the top coat. The micro-roughness of the matte coat is replicated to transfer a sufficiently low gloss to resemble the appearance of natural wood grain. However, other gloss levels also can be produced. The formulation of the matte release coat (described below) provides a combination of the desired low gloss surface, together with a smooth or free release of the carrier sheet from the replicated low gloss surface at elevated stripping temperatures.

Following stripping of the carrier sheet, the decorated, embossed sheet 72 passes from the cooling rolls 70 to a forming station 74 using forming dies to shape the edges of the sheet and punch mounting holes at desired intervals. Further cooling occurs between stripping of the carrier and the forming station. The formed sheet is then passed to a cutting station 76 for cutting the sheet into separate panels. A finished panel 78 is illustrated schematically in FIG. 5.

The matte release coat formulation comprises a coating which can be applied to the carrier by conventional casting techniques, such as roller coating. The preferred coating composition is a thermosetting resinous material which, when exposed to heat for drying it, also crosslinks and permanently bonds as a surface film adhered to the carrier sheet. The solids contained in the matte release coat preferably include, as a principal component, one or more crosslinking agents to provide good adhesion of the dried crosslinked coating to the polyester carrier film. In one embodiment, the matte release coat formulation includes a primary crosslinking resin such as a vinyl resin that bonds to the polyester film. A suitable vinyl resin is a medium molecular weight vinylchloride-vinylacetate resin known as VAGH, described in more detail in Example 1 below. This vinyl resin can be present in an amount up to about 20% of the total solids in the matte release coat. In addition, the matte release coat can include a secondary crosslinking resin to improve release of the clear coat from the matte release coat. In one embodiment, the secondary crosslinking resin can be an acrylic modified alkyd resin such as the resin known as Chempol 13 1501 also described in more detail in Example 1. This secondary crosslinking resin comprises from about 1% to about 15% of the total solids of the matte release coat. The matte release coat further includes a suitable catalyst for accelerating the crosslinking process, typically comprising from about 1% to 2% of the total solids in the matte release coat.

The resinous components of the matte release coat composition are mixed with suitable solvents. In one embodiment, the resins are mixed with a primary resin solvent such as methyl isobutyl ketone (MIBK) which comprises about 65% to about 85% of the total solvent in the formulation. A secondary resin solvent such as isopropyl alcohol (IPOH) is useful in retarding crosslinking of the resins in solution. The secondary resin solvent preferably comprises from about 5% to about 20% of the total of solvent.

The matte release coat formulation is prepared by dissolving the primary crosslinking resin in the primary and secondary resin solvents by mixing and then adding the secondary crosslinking resin, together with a primary matting agent, preferably in the form of a filler comprising a fine particulate inert inorganic material. In one embodiment, the filler comprises aluminum silicate with an average particle size of about 4.8 microns. The filler contained in the formulation comprises up to about 25% of the total solids in the matte release coat. The fine particulate filler is thoroughly dispersed in the resin and resin solvent blend, preferably under elevated temperatures from about 100° to about 120° F.

In use, when the matte release layer dries and cross-links, it forms a chemical matte coating on the surface of the carrier sheet. The matte surface is controlled by the amount and particle size of the filler. The fine particles project through the dried exterior surface of the matte release coat to form, on a microscopic scale, a surface with a micro-roughness that transfers to the surface of the dried top coat a replicated micro-roughness that produces light-scattering, resulting in a low surface gloss on the top coat.

The matte release coat formulation also includes a release agent to enhance freely releasing the carrier and its matte release coat from the top coat during the transfer process. The release agent preferably includes a wax component such as a polyethylene wax which melts at elevated temperatures to allow easy hot release of the release coat. The wax component is normally suspended in the matte release coat at temperatures below the transfer-embossing temperature; and the wax component, in its suspended or particulate form, acts as a matte agent to enhance transfer of the low surface gloss to the clear coat. The temperature of the extrusion at the transfer-embossing point of the process heats the laminate (including the release coat) to melt the wax sufficiently for it to enhance the release properties of the matte release coat. Preferably, the melting point of the wax is below the temperature at which the release-coated carrier is stripped from the laminate. In a preferred polyethylene wax known as Shamrock S-381-N1 (described in Example 1 below), the melting point of the wax is about 206° F. Stripping of the release-coated carrier is preferably carried out at temperatures more than about 80° F. above the melting point of the wax, to enhance release properties. The wax, which melts at relatively higher temperatures as it dries, can have a crystalline or semi-crystalline structure; the wax, at relatively lower temperatures, is believed to crystallize and reform particles which affect the matte transferred to the laminate. In one preferred form of the release coat formulation, the polyethylene wax comprises from about 12% to about 25% of the solids contained in the matte release coat.

The release agent contained in the matte release coat formulation further includes a silicone resin component which combines with the polyethylene wax to enhance free release of the clear coat from the matte release coat at elevated temperatures. In one embodiment, the silicone resin comprises from about 2.5% to about 25% of the solids contained in the matte release coat formulation. Release is improved and lower gloss is transferred when the wax and silicone resin are used in combination in the matte release coat.

In one embodiment, the clear coat or top coat 38 is a transparent, or substantially transparent, thermoplastic synthetic resinous coating composition. The preferred dry film thickness of the top coat is about 0.3 to about 1.5 mils. Preferably, the top coat lacquer formulation produces a dry film form exterior outdoor weatherable coating having desired properties of hardness and abrasion resistance, along with weatherability properties such as UV resistance and resistance to water and humidity exposure. The top coat formulation also enhances having transferred to it a low gloss surface from the matte release coat. In one embodiment, the top coat is formulated from a thermoplastic synthetic resinous coating which, in dry film form, softens and deforms under elevated temperatures so that the three-dimensional impressions can be formed in its exterior surface during the embossing step, while replicating the micro-roughness from the matte release coat to produce the low gloss surface. The top coat preferably comprises a blend of a thermoplastic fluorinated polymer and an acrylic resin as its principal components. The fluorinated polymer component is preferably a thermoplastic fluorocarbon resin, such as polyvinylidene fluoride (PVDF) or polyvinyl fluoride (PVF). The fluorinated polymer resin also can include copolymers and terpolymers of vinylidene fluoride or polyvinyl fluoride, or mixtures thereof. One thermoplastic fluorocarbon useful as the top coat is the PVDF known as Kynar, a trademark of Atochem, formerly Pennwalt Corp. This polymer is a high molecular weight polymer which provides a useful blend of durability and chemical resistance properties. The PVDF component preferably comprises from about 65% to about 90% of the total solids present in the top coat.

The acrylic resin component of the top coat can be a polymethylmethacrylate or a polyethylmethacrylate resin, or mixtures thereof, including methacrylate copolymer resins, and minor amounts of other comonomers. The top coat also can include minor amounts of block copolymers and other compatibilizers to stabilize the blended PVDF and acrylic resin system and provide compatibility with the underlying film.

In one embodiment, a principal component of the acrylic resin contained in a top coat is a medium molecular weight polyethylmethacrylate resin such as Elvacite 2042, a trademark of DuPont. This acrylic resin clarifies the top coat, hardens the top coat, and improves adhesion to the underlying print coat. In its preferred form, the acrylic component comprises from about 10% to about 35% of the total solids contained in the top coat formulation.

The PVDF and acrylic based top coat formulation can be prepared as a dispersion of the PVDF and a solution of the acrylic resin. In one embodiment, the top coat formulation is prepared by mixing the acrylic resin with a suitable organic solvent and applying heat to dissolve the resin. The mixture is then allowed to cool sufficiently before adding the PVDF component, so that the PVDF will not dissolve, but will be maintained as a dispersion in the acrylic-solvent based mixture. By maintaining the PVDF component as a dispersion in the top coat, solvent evaporation during drying of the top coat can be improved. In one formulation, a primary solvent can be cyclohexanone, a latent solvent for the PVDF, comprising from about 92% to about 100% of the solvent component. A secondary solvent such as n-methyl-2-pyrrollindone, preferably comprising up to about 8% of the total solvent component, can be used in the formulation as a solvent for the PVDF to aid in the film formation.

Other minor components of the top coat formulation can include UV absorbers comprising up to about 3% of the total solids and a dispersing agent such as Solsperse 17000 (trademark of ICI Americas) useful for reducing the viscosity of the dispersion coating. The dispersing agent preferably comprises up to about 4% of the PVDF component.

EXAMPLE 1

| | Component | Parts |
|---|---|---|
| Composition 1: | Methyl isobutyl ketone (MIBK) | 38.3 |
| | Isopropyl alcohol (IPOH | 6.7 |
| | VAGH | 4.8 |
| | ASP400 | 44.3 |
| | Chempol 13-1501 | 5.9 |
| | | 100.0 |
| Composition 2: | Methyl isobutyl ketone | 56.7 |
| | Isopropyl alcohol | 9.0 |
| | VAGH | 15.1 |
| | Chempol 13-1501 | 19.2 |
| | | 100.0 |
| Release Coat 1: | Composition 1 | 41.8 |
| | Composition 2 | 21.1 |
| | SR107 | 1.2 |
| | S381-N1 | 5.0 |
| | MIBK/IPOH Blend (85/15) | 21.4 |
| | Cycat 4040 | 3.8 |
| | Cymel 303 | 5.7 |
| | | 100.0 |
| Release Coat 2: | Composition 1 | 39.7 |
| | Composition 2 | 20.0 |

| Component | Parts |
|---|---|
| SR107 | 2.0 |
| S381-N1 | 9.0 |
| MIBK/IPOH Blend (85/15) | 20.3 |
| Cycat 4040 | 3.6 |
| Cymel 303 | 5.4 |
| | 100.0 |

1. VAGH is a medium molecular weight, partially hydrolyzed vinyl chloride-vinyl acetate resin (approximately 90% vinyl chloride, 4% vinyl acetate and a hydroxyl content of 2.3%) sold by Union Carbide, Somerset, N.J.
2. ASP400 is an aluminum silicate of average particle size 4.8 microns made by Engelhard Corp., Edison, N.J., and sold by Jensen-Souder, Itasca, Ill.
3. Chempol 13-1501 is an acrylic modified alkyd resin solution (50% resin, 50% xylol) sold by Freeman Chemical Co., Port Washington, Wisc.
4. SR-107 is a silicone resin manufactured by General Electric, Waterford, Conn., and sold by Fitzchem, Chicago, Ill.
5. S381-N1 is a polyethylene wax sold by Shamrock Chemicals Corp., Newark, N.J.
6. Cycat 4040 is a para toluene sulfonic acid catalyst (40% by weight in isopropanol) sold by American Cyanamid Co., Walingford, Conn.
7. Cymel 303 is a liquid hexamethoxy-methylmelamine cross-linking agent sold by American Cyanamid.

Composition 1 was produced by dissolving the VAGH resin in an MIBK and IPOH blend by mixing in a Cowles mixer and then adding the Chempol 13-1501 and ASP400 while mixing. This mixture was then sandmilled at a temperature of about 110° F. to disperse the ASP400.

An exterior top coat was formulated from the following components:

| Component | Parts |
|---|---|
| Cyclohexanone (1) | 40.0 |
| Elvacite 2042 | 10.5 |
| Solsperse 17000 | 0.1 |
| Tinuvin 234 | 0.6 |
| Kynar 301F (PVDF) | 27.0 |
| n-methyl-2-pyrollidone | 2.5 |
| Cyclohexanone (2) | 19.3 |
| | 100.0 |

8. Elvacite 2042 is a polyethylmethacrylate resin with a weight-average molecular weight of 300,000, sold by DuPont, Wilmington, Del.
9. Solsperse 17000 is a polymeric fatty ester dispersing agent sold by ICI Americas Inc., Wilmington, Del.
10. Tinuvin 234 is a 2-($3^1$,$5^1$,bis(1-methyl 1-phenylethyl)-$2^1$ hydroxyphenyl) benzotriazole U.V. light stabilizer sold by Ciba Geigy, Hawthorne, N.Y.
11. Kynar 301F is a polyvinylidene fluoride polymer sold by Pennwalt Corp., Philadelphia, Pa.

The Elvacite 2042, Solsperse 17000 and Tinuvin 234 were first dissolved in the cyclohexanone (1) solvent at a temperature of 130° F. and allowed to cool to room temperature. The PVDF was then dispersed in the resin solution using a 14 inch Cowles blade at 1800 RPM. The temperature of the PVDF dispersion was kept below 110° F. to avoid gelation of the dispersion. Next, the n-methyl-2-pyrollidone and the remaining cyclohexanone (2) were preblended before mixing into the PVDF dispersion. In this embodiment, the top coat was not pigmented.

Preparation of the Wood Grain Printed Transfer Foil

The matte release coat was gravure coated with a 100 HK gravure cylinder pattern at a coat weight (dried) of 3 gr/m$^2$ onto a 75 gauge oriented gloss polyester carrier sheet (Hostaphan 2000, sold by Hoechst Celanese, Greer, S.C.) at 200 feet per minute and dried and cross-linked in a 20 foot impinging-air oven (Oven No. 1 in FIG. 2) at an air temperature of 340° F. (web temperature approximately 220° F.).

Next, the clear coat was coated at a coating weight (dried) of 16 gr/m$^2$ onto the dried matte release coat in a reverse-roll coater station on the same coater and dried and fused in a 120 foot three-zone impinging air oven with the air temperatures in the three zones being 240° F., 340° F., and 340° F. (see FIG. 2). This formed a transparent clear coat on the matte release coat of the carrier film.

To minimize web shrinkage and avoid distortion of the carrier film, web tension was maintained below 0.8 lbs/linear inch of web width through the drying ovens.

The dried, coated film was wound as a roll, removed from the first coater and set up on the unwind station of a second coater (FIG. 3). The clear-coated side of the coated film was then gravure printed at a speed of 200 feet per minute with a series of two grain prints and then a size coat. The drying oven temperature was 250° F. The grain inks and the size coat were made by pigmenting a 25% solution of DuPont's Elvacite 2010, polymethylmethacrylate, in a MIBK/toluene blend with pigment dispersions such as GCW 46-39000 made by Gibraltar Chemical, South Holland, Ill. The size coat was applied using a 137 HK gravure cylinder and contained pigment of about 10% by volume. The dried coat weight of the grain coats ranged from 0.1–2 gr/m$^2$ and the size coat was about 2 gr/m$^2$. After drying, the roll of wood grain printed transfer foil was removed from the second coater and installed on an unwind station of the extruder-laminator line (FIG. 1).

Production of Experimental Painted Wood-Like Vinyl Siding

A 50% inorganic particle-filled ethylene-vinyl acetate/PVC material with a glass transition temperature of 61° C. (142° F.) was extruded at a temperature of about 400° F. at a speed of 35 ft/min and a thickness of about 44 mils. The crossweb width was approximately 18 inches. The vinyl sheet contained a pigment to provide the background color of the vinyl siding panel. The previously produced wood grain printed transfer foil was passed, along with the extruded film, through the nip of an embossing station, which included a 12.5 inch diameter metal embossing roller. The embossing station was approximately five inches from the extruder die exit opening so that the extruded film during transfer and embossing had essentially the same temperature as the temperature of the extruded film at the extruder die exit opening. The polyester carrier sheet surface was in contact with the metal embossing roller, and the size coat was in contact with the extruded film.

The embossing roll imprinted a three-dimensional pattern in the transfer-decorated film which simulated wood grain in the form of painted wood with random lines generally in one direction of various lengths, widths and depths spaced about 1 to 2 mm apart with an average peak-to-valley height of about 20 to 120 microns. There were some deeper embossed lines. When viewed in oblique light, the embossing cast shadows similar to those found with natural painted wood viewed the same way.

The extruded sheet was cooled to a temperature of about 308° F. before stripping the carrier film from the decorated vinyl sheet at a stripping station downstream from the transfer and embossing station. The carrier film had a sufficient thickness (75 gauge or 0.75 mil) to allow the metal embossing roller pattern to be transferred, while maintaining the film strength to be hot stripped from the clear coat at a temperature of 308° F. The release-coated carrier sheet was wound for disposal, and the clear-coated, wood grain decorated embossed extruded vinyl material proceeded to forming dies where the siding was formed by shaping the edges, punching mounting holes, and then cutting to size.

Vinyl siding produced by this process using both Release coatings 1 and 2 had 75° gloss readings of 14–15 gloss units, giving the look of natural painted or stained wood, compared to the 40–50 gloss units obtained with silicone coated paper release backings. Surface gloss was measured by ASTM test D 3679-86, 5.11.

Release coat 1 had a tight release during the stripping step, whereas Release coat 2 had an easy release, similar to the silicone coated release paper. When a 100 gauge polyester film was substituted for the 75 gauge film used in the previous example, the embossing depth was not deep enough and did not give a pleasing wood-like appearance.

EXAMPLE 2

Vinyl siding was produced experimentally as described in the previous example using a 75 gauge polyester carrier film and using the following release coat:

| Release Coat 3: | Parts |
| --- | --- |
| Composition 1 | 40.7 |
| Composition 2 | 20.6 |
| SR107 | 9.0 |
| S381-N1 | 0.4 |
| MIBK/IPOH blend | 20.1 |
| Cycat 4040 | 3.7 |
| Cymel 303 | 5.5 |
|  | 100.0 |

Despite the high level of silicone in the release coat, the hot release of the release-coated carrier was unacceptably high, and the 75° gloss also increased to 25 gloss units. Release was at a temperature of about 308° F.

EXAMPLE 3

To test the effect of changes in the concentration of SR107 silicone resin and S381-N1 wax in the release coat on both the gloss and the hot release, a series of formulations were prepared, as shown in Table 1. For convenience, lab drawdowns of these formulations were made on a Mylar carrier, overcoated with the PVDF/acrylic clear-coat, and then transferred to a flat ABS panel. Hot release was done manually at a temperature of 290° to 300° F., and 85° gloss was then measured. The gloss readings were taken with a tri-gloss meter sold by BYK-Chemie, Walingford, Conn. The data indicated that increasing levels of silicone increases the gloss and decreases the release force, whereas increasing the wax level decreases the gloss and the release force. Optimum formulations include both the silicone and the wax. The 75° gloss measured on production samples is significantly lower than the 85° gloss measured on lab samples of the same formulation.

TABLE 1

| | Release Formulations | | | | | | | | |
|---|---|---|---|---|---|---|---|---|---|
| | 4 | 5 | 6 | 7 | 8 | 9 | 10 | 11 | 12 |
| Comp. 1 | 50.2 | 47.8 | 45.6 | 45.3 | 43.5 | 41.7 | 41.9 | 40.2 | 38.7 |
| Comp. 2 | 25.4 | 24.2 | 23.1 | 23.0 | 22.0 | 21.1 | 21.2 | 20.3 | 19.5 |
| SR107 | 0.0 | 4.7 | 9.0 | 0.0 | 4.3 | 8.2 | 0.0 | 4.0 | 7.6 |
| S381-N1 | 0.0 | 0.0 | 0.0 | 4.5 | 4.3 | 4.1 | 8.3 | 8.0 | 7.6 |
| MIBK/IPOH | 14.2 | 13.6 | 13.1 | 18.0 | 17.1 | 16.5 | 20.1 | 19.3 | 18.8 |
| Cycat 4040 | 4.1 | 3.9 | 3.7 | 3.7 | 3.5 | 3.4 | 3.4 | 3.3 | 3.1 |
| Cymel 303 | 6.1 | 5.8 | 5.5 | 5.5 | 5.3 | 5.0 | 5.1 | 4.9 | 4.7 |
| | 100 | 100 | 100 | 100 | 100 | 100 | 100 | 100 | 100 |
| 85° Gloss | 49.0 | 57.0 | 54.0 | 25.0 | 30.0 | 35.0 | 35.0 | 25.0 | 29.0 |
| Hot Rel. | Fail | T | T | T | Easy | Easy | T | Easy | Easy |

Fail - Adhesive failure between the release coat and the polyester film
T - Tightness (would not be acceptable in production)
Easy - Releases freely
In a test considered a failure, the release coat transfers with the clear coat during stripping.
In a test involving tight release, the vinyl tends to transfer with the laminate during stripping.

EXAMPLE 4

A vinyl siding foil was prepared from formulations similar to Example 1. The resulting coatings were coated onto different types of flexible carrier sheets, after which the laminates were transferred to flat plastic panels. Eighty-five degree gloss was measured with the following results:

TABLE 2

| Carrier | 85° Gloss Units |
|---|---|
| Gloss polyester film | 96 |
| Hoechst Sp-23 - Super matte polyester film | 45 |
| Gloss polyester film with the matte release of this invention | 16 |

EXAMPLE 5

Test panels were subjected to accelerated weatherability tests. Accelerated UV resistance, also referred to as QUV, was measured using a standard accelerated test procedure to determine long-term UV resistance and other weatherability properties. One test includes exposure to UV light and humidity exposure (from water condensation on the test panel) to test surface deterioration, color change, gloss change, and loss of coating adhesion. Weatherability also was measured with a Modified Sunshine Arc Weatherometer test. A standard Sunshine Carbon Arc Weatherometer uses exposure to two carbon arc light sources; the modified test procedure used three light sources. The bulbs were contained in a cabinet which included a drum for revolving the panel around the light sources. The test panel was exposed to the light sources periodically and to a water spray cycle at selected time intervals.

Delamination between the decorative wood grain paint coat and the extruded vinyl sheet was observed when wood grain decorated vinyl siding test panels were exposed to these accelerated weathering tests. The siding panels initially tested for weatherability consisted of the PVDF/acrylic clear coat, acrylic wood grain print inks, and an acrylic size (adhesion) coat. The extruded vinyl sheet was pigmented to provide the underlying color coat. Delamination of these vinyl siding panels was proceeded by UV degradation of the vinyl sheet, since discoloration of the vinyl was observed whenever delamination occurred. The hours of failure in these tests depended upon ink coverage and pigmentation levels. The composition of the vinyl siding also was found to be factor in how soon delamination occurred. The following accelerated weathering test results were produced with these vinyl siding panels.

TABLE 3

| No. | Description | QUV Hours | Modified Sunshine Arc |
|---|---|---|---|
| 1 | Grey wood grain | 1000 | Not Tested |
| 2 | Grey/green wood grain | 1500 | 43 cycles |
| 3 | Milky oak wood grain | 2000 | 43 cycles |
| 4 | Barn red wood grain | 1500 | 43 cycles |

A pigmented acrylic color coat was coated behind the wood grain inks to test its protection of the PVC sheet from UV degradation. This color coat is shown, for example, at 80 in the laminate illustrated in FIG. 6. Laboratory samples were prepared using acrylic color coats pigmented with exterior grade titanium dioxide and mixed metal oxide (MMO) pigments. These samples exceeded 3500 hours of QUV testing without delamination. However, these same samples were found to delaminate when exposed to the specially modified Sunshine Arc Weatherometer (one cycle is one hour "on" and one hour "off"). The delamination occurred between the PVDF/acrylic clear coat and the color coat, with the grain inks splitting. Test results were as follows:

TABLE 4

| Test No. | Grain Ink | Color Coat | | QUV Hours | Modified Sunshine Arc |
|---|---|---|---|---|---|
| | | Resin | Pig. Vol. | | |
| 5 | Acrylic | Acrylic | 35% | 3500 | 109 cycles (Fail) |
| 6 | Acrylic | Acrylic | 45% | 3500 | 239 cycles (Fail) |

As a follow-up to these tests, the addition of more UV absorber to the clear coat and including UV absorbers in the grain and color coats was found to retard delamination failure in QUV testing, but improvement was limited.

Replacing the acrylic resin in the grain ink coats and color coats with blends of fluoropolymer resin and acrylic resin was evaluated. The two fluoropolymers evaluated were Pennwalt's Kynar 7201 and Kynar 9301 (also known as Kynar ADS). The Kynar 7201 constructions with the fluoropolymer in both the grain inks and color coats produced the best resistance to delamination. Laboratory samples were exposed to 700 cycles in the specially modified Sunshine Arc test and 3500 hours in the QUV test with no delamination or tape-off. Kynar 9301 constructions with the fluoropolymer in both the grain inks and color coats showed only slight tape-off after 700 cycles in the specially modified Sunshine Arc Weatherometer, and no failure after 3500 hours in the QUV test. The test results were as follows:

TABLE 5

| | | Color Coat | | Exposure time to Failure | |
|---|---|---|---|---|---|
| Test No. | Grain Ink | Resin | Pig. Vol. | QUV Hours | Modified Sunshine Arc |
| 7 | Acrylic | Kynar 7201/ Acrylic | 35% | 3500 | 700 cycles (Slight Tape-off) |
| 8 | Acrylic | Kynar 7201/ Acrylic | 45% | 3500 | 700 cycles (Fail) |
| 9 | Kynar 7201/ Acrylic | Kynar 7201/ Acrylic | 45% | 3500 | 700 cycles (Good) |
| 10 | Kynar 7201/ Acrylic | Kynar 7201/ Acrylic | 45% | 3500 | 700 cycles (Good) |
| 11 | Kynar 9301/ Acrylic | Kynar 9301/ Acrylic | 35% | 3500 | 700 cycles (Slight Tape-off) |

The test results showed good long-term weatherability of vinyl siding panels having a decorative coating which includes at least an underlying color coat containing at least a weatherable fluoropolymer resin containing a level of pigment sufficient to block UV radiation and thereby retard delamination by inhibiting UV degradation of the vinyl sheet.

EXAMPLE 6

The use of mixed metal oxide (MMO) pigments in the wood grain print inks is desirable because of the excellent durability of mixed metal oxides and the availability of an I.R. reflective, mixed metal black pigment which minimizes heat build-up in the wood grain decorated vinyl siding. However, the mixed metal oxide pigments can result in excessive gravure cylinder wear when the grain ink print patterns are coated by a gravure cylinder. This can increase manufacturing costs and disrupt production by requiring the cylinders to be rechromed at less than 50,000 linear feet intervals. An attempt was made to use carbon black, along with exterior durable organic pigments to resolve the cylinder wear problem. The wood grain decorated vinyl siding made in this way exceeded the acceptable heat build-up temperature and could result in warpage or "oil canning" of the vinyl siding during use. To resolve this problem, grain ink pigments were produced rematching the original color standards by using a blend of organic pigments comprising Chromophatal Brown 5R and Chromophatal Blue A3R (both trademarks of Ciba Geigy). These organic pigments were used in place of the carbon black, along with other durable organic pigments. Vinyl siding made using inks made with this all-organic system had acceptable heat build-up temperatures. (Temperatures of 140° F. and above are considered unacceptable.) Heat build-up test results were as follows:

TABLE 6

| Infra-Red Heat Lamp Heat Build-Up (°F.) | | | | | |
|---|---|---|---|---|---|
| Min. | White Std. | Carbon Black Std. | Grey/ Green W/MMO's | Grey/Green w/Carb. Blk No MMO's | Grey/Green No Carb Blk No MMO's |
| 0 | 73 | 78 | 74 | 79 | 79 |
| 1 | 89 | 110 | 86 | 99 | 89 |
| 3 | 101 | 124 | 92 | 110 | 95 |
| 6 | 108 | 133 | 97 | 118 | 99 |
| 9 | 116 | 150 | 107 | 129 | 110 |
| 12 | 121 | 159 | 114 | 135 | 116 |
| 15 | 124 | 164 | 119 | 139 | 120 |
| 20 | 125 | 167 | 122 | 141 | 123 |
| 25 | 127 | 168 | 124 | 143 | 125 |
| 40 | 128 | 172 | 126 | 141 | 127 |

In certain instances, the invention can be carried out to produce outdoor weatherable panels that do not have an embossed wood grain or a low gloss surface finish resembling natural wood or the like. For instance, it has been found that weatherable coatings containing a fluoropolymer resin, such as the PVDF or PVF resins, can be coated onto a carrier sheet and later transferred to an extruded plastic sheet or panel as described above. These fluoropolymer resin coatings can be blended with acrylic coatings, such as polymethylmethacrylate or polyethylmethacrylate resins. These coatings are cast on the carrier sheet, preferably in a dry coating thickness in the range of about 0.5 to about 1.5 mil. The preferred weatherable film is a clear coat/color coat combination with the color coat containing a pigment at a level to provide opacity sufficient to retard UV degradation of the extruded sheet during use. The extruded sheet can be made from a vinyl polymer, although polyester, polyolefins, and the other extrudable materials described above for the extruded film 12 also can be used. The weatherable decorative coating is transferred to the extruded sheet under the pressure and temperature levels described above with respect to the process illustrated in FIG. 1. The hot laminating of the weatherable polymer cladding to the heated extruded sheet as it comes out of the extruder die opening produces a good bond between the weatherable decorative coating and the extruded sheet.

The invention has been described in relation to its use with extruded plastic siding panels, although other similar uses are contemplated, such as window and door moldings, rain gutters, and other outdoor structures, for example.

What is claimed is:

1. An outdoor weatherable decorative clad plastic siding panel comprising a substrate panel containing an extrudable thermoplastic material, the substrate panel having an outer surface area, and a decorative and protective exterior coating bonded to and covering the outer surface area of the substrate panel and comprising a top coat formed as a continuous cast film on an underlying color coat formed as a continuous cast film and visible through the top coat, the top coat and color coat each containing a weatherable fluoropolymer resin, the color coat containing a sufficient amount of dispersed pigment to cover the surface area of the substrate panel and thereby retard UV degradation of the underlying substrate panel, the top coat having an exterior surface with a transferred microroughness providing a 75° gloss level of less than about 20 gloss units covering a major surface area of the top coat.

2. The panel according to claim 1 in which the top coat and the color coat each contain a blended PVDF and acrylic resin.

3. The panel according to claim 1 in which the color coat contains a uniformly dispersed pigment level of at least about 35% by volume.

4. The panel according to claim 3 in which the pigment level is at least about 45% by volume.

5. An outdoor weatherable decorative clad plastic siding panel comprising a plastic substrate sheet having an outer surface area, and a decorative and protective exterior coating formed as a continuous cast film bonded to and covering the outer surface area of the substrate sheet, the decorative and protective coating forming an exterior surface of the siding panel and comprising a weatherable thermoplastic polymer having a dispersed pigment to provide a layer of coloration, said exterior surface of the siding panel having a transferred microroughness providing a 75° gloss level of less than about 20 gloss units distributed essentially uniformly across said exterior surface.

6. The panel according to claim 5 in which the exterior coating contains a blended PVDF and acrylic resin and contains a level of pigment sufficient to cover the surface area of the underlying substrate panel and retard UV degradation thereof.

7. An outdoor weatherable decorative clad plastic siding panel comprising a plastic substrate sheet having an outer surface area, and a decorative and protective exterior coating bonded to the exterior surface area of the substrate sheet, the decorative coating comprising a weatherable thermoplastic polymer having embossed indentations formed depthwise in the thermoplastic coating and permanently set therein to form a pattern of surface embossments in a exterior surface thereof, in which the decorative coating includes a weatherable outer clear coat formed as a continuous cast film and an underlying color coat formed as a continuous cast film visible through the clear coat and containing a sufficient amount of a dispersed pigment to cover the surface area of the substrate sheet and thereby retard UV degradation of the substrate sheet.

8. The product according to claim 7 in which the top coat has an exterior surface with a transferred microroughness providing a 75° gloss level of less than about 20 gloss units.

9. An outdoor weatherable decorative clad plastic siding panel comprising a plastic substrate sheet, and a decorative and protective coating bonded to the substrate sheet, the decorative and protective coating comprising a weatherable polymer which includes an exterior paint coat formed as a continuous cast film containing a substantially uniformly dispersed pigment at a level sufficient to retard UV degradation of the underlying plastic substrate sheet, and in which the coating includes one or more print coats formed by an ink in a level sufficient to limit heat build-up in the finished panel.

10. An outdoor weatherable decorative clad plastic siding panel having the appearance of natural woodgrain, comprising a plastic substrate sheet containing a vinyl polymer, the substrate sheet having an outer surface area, and a decorative and protective exterior coating bonded to the outer surface area of the substrate sheet, the decorative and protective coating comprising a weatherable polymer different from the polymer comprising the substrate sheet and having embossed indentations formed depthwise in the thermoplastic coating and permanently set therein to form a pattern of surface embossments in an exterior surface thereof simulating the appearance of natural woodgrain, in which the decorative and protective coating includes a weatherable outer clear coat formed as a continuous cast film and at least one underlying color coat visible through the clear coat and formed as a continuous cast film containing a sufficient amount of substantially uniformly dispersed pigment to cover the surface area of the substrate sheet and thereby significantly retard UV degradation of the substrate sheet, said dispersed pigment including one or more print coats comprising an ink dispersed at a level sufficient to significantly limit heat build-up in the panel.

11. The panel according to claim 10 in which the weatherable outer clear coat has an exterior surface with a transferred microroughness providing a 75° gloss level of less than about 20 gloss units covering a major surface area thereof.

12. The panel according the claim 10 in which the outer clear coat and the color coat each contain a fluoropolymer resin.

13. The panel according to claim 12 in which the clear coat and color coat contain a blended PVDF and acrylic resin.

14. An outdoor weatherable decorative clad plastic siding panel comprising a substrate panel made from an extrudable thermoplastic polymeric material, the substrate panel having an outer surface area, and a decorative and protective exterior coating bonded to and covering the surface area of the substrate panel and comprising a continuous cast film comprising a weatherable polymer containing a sufficient amount of dispersed pigment to cover the surface area of the substrate panel and thereby retard UV degradation of the underlying substrate panel, the exterior coating including one or more print coats formed by an ink at a dispersed level sufficient to retard heat build-up in the finished panel, the exterior coating further having an exterior surface with a transferred microroughness providing a 75° gloss level of less than about 20 gloss units covering a major surface area of said exterior surface.

15. The panel according to claim 14 in which the exterior coating and the print coat contain a fluoropolymer resin.

16. The panel according to claim 14 in which the exterior coating and the print coat comprise a blended PVDF and acrylic resin.

17. The panel according to claim 16 in which the substrate panel is made from a vinyl polymer.

\* \* \* \* \*